US012806768B2

(12) United States Patent
Niemueller

(10) Patent No.: US 12,806,768 B2
(45) **Date of Patent: *Nov. 24, 2026**

(54) ROBOT EXECUTION SYSTEM

(71) Applicant: Intrinsic Innovation LLC, Mountain View, CA (US)

(72) Inventor: Tim Niemueller, Gauting (DE)

(73) Assignee: Intrinsic Innovation LLC, Mountain View, CA (US)

(*) Notice: Subject to any disclaimer, the term of this patent is extended or adjusted under 35 U.S.C. 154(b) by 619 days.

This patent is subject to a terminal disclaimer.

(21) Appl. No.: 18/144,782

(22) Filed: May 8, 2023

(65) Prior Publication Data

US 2023/0278203 A1 Sep. 7, 2023

Related U.S. Application Data

(63) Continuation of application No. 16/885,015, filed on May 27, 2020, now Pat. No. 11,679,498.

(51) Int. Cl.

*B25J 9/16* (2006.01)
*B25J 13/00* (2006.01)
*H04L 67/55* (2022.01)

(52) U.S. Cl.

CPC ............. *B25J 9/163* (2013.01); *B25J 9/1656* (2013.01); *B25J 13/006* (2013.01); *H04L 67/55* (2022.05)

(58) Field of Classification Search

CPC ........ B25J 9/163; B25J 9/1656; B25J 13/006; B25J 9/1664; H04L 67/55; G05B 2219/40519

See application file for complete search history.

(56) References Cited

U.S. PATENT DOCUMENTS 5,412,759 A 5/1995 Yano et al.
9,149,931 B2 10/2015 Kamiya
9,382,643 B2 7/2016 Moore et al.
10,668,623 B2 6/2020 Zhang et al.
11,679,498 B2 * 6/2023 Niemueller .............. B25J 9/163 700/248
11,787,054 B2 * 10/2023 Kroeger ................. B25J 9/1676 700/245
2008/0058990 A1 3/2008 Sassatelli et al.
2021/0027058 A1 * 1/2021 Ma ......................... B25J 9/1664
2021/0187746 A1 * 6/2021 Beardsworth .......... B25J 9/1694
2021/0197377 A1 * 7/2021 Gaschler .................. B25J 5/007

(Continued)

*Primary Examiner* — Robert T Nguyen
(74) *Attorney, Agent, or Firm* — Fish & Richardson P.C.

(57) ABSTRACT

Methods, systems, and apparatus, including computer programs encoded on computer storage media, for rule execution in an online robotics system. One of the systems includes an execution engine subsystem and an execution memory subsystem. The execution engine receives rules having types and subtypes that represent a particular entity in an operating environment of a robot, provides subscription requests to the execution memory subsystem, and receives events emitted by the execution memory subsystem. The an execution memory receives subscription requests from the execution engine subsystem, receives new observations, converts the new observations into fact updates, performs pattern matching with the fact updates against the patterns of the subscription requests, and emits events to the execution engine subsystem for patterns that have been matched by the fact updates.

20 Claims, 7 Drawing Sheets

(56) References Cited

U.S. PATENT DOCUMENTS

| | | | | |
|---|---|---|---|---|
| 2021/0197378 | A1 | 7/2021 | Schonherr et al. | |
| 2022/0193908 | A1 | 6/2022 | Kroeger | |
| 2022/0402123 | A1 | 12/2022 | Niemueller et al. | |
| 2023/0286148 | A1 * | 9/2023 | Beardsworth | B25J 9/163 |
| 2024/0184291 | A1 * | 6/2024 | Hermans | B25J 9/1664 |
| 2026/0102909 | A1 * | 4/2026 | Lynch | B25J 9/163 |

* cited by examiner

ROBOT EXECUTION SYSTEM

CROSS-REFERENCE TO RELATED APPLICATION

This is a continuation of U.S. application Ser. No. 16/885,015, filed on May 27, 2020, the disclosure of which is considered part of and is incorporated by reference in the disclosure of this application.

BACKGROUND

This specification relates to robotics, and more particularly to planning robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a schedule that is manually generated for one workcell can generally not be used for other workcells. In this specification, a workcell is the physical environment in which a robot will operate. Workcells have particular physical properties, e.g., physical dimensions, that impose constraints on how robots can move within the workcell. Thus, a manually programmed schedule for one workcell may be incompatible with a workcell having different robots, a different number of robots, or different physical dimensions.

SUMMARY

This specification describes an execution system for driving one or more robots. The execution system is responsible for driving the execution of plans, monitoring for potential faults and contingencies, and initiating action to mitigate such faults. To deliver these features, the execution system relies on a knowledge-based system that uses two functionally separated execution components, an execution engine subsystem and an execution memory subsystem.

Particular embodiments of the subject matter described in this specification can be implemented so as to realize one or more of the following advantages. The techniques described in this specification allow for a more efficient representation of facts and processing of fact updates in a robotic working environment. This allows a robotic system to process vastly more online observations, which is critical for building sensor-rich robotic systems that can react in real-time to unexpected occurrences or failures. The techniques of the knowledge-based system described below allow fact updates to be efficiently processed by considering only rule conditions that the fact updates are relevant to. In addition, the system can further limit voluminous fact-based information by emitting events only upon the first instance of a particular rule pattern being matched.

The techniques described below also allow a robotic system to emit exact traces of facts as they are added or removed from the execution memory subsystem. Each trace includes data representing which rules fired, when, and based upon which facts. In addition, the execution flow is driven by information and situations matching the data in the execution memory subsystem rather than being driven by imperative constructs. Therefore, any rule can be triggered at any time rather than being dependent upon whether or not the system is at the right place during execution of a computer program.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
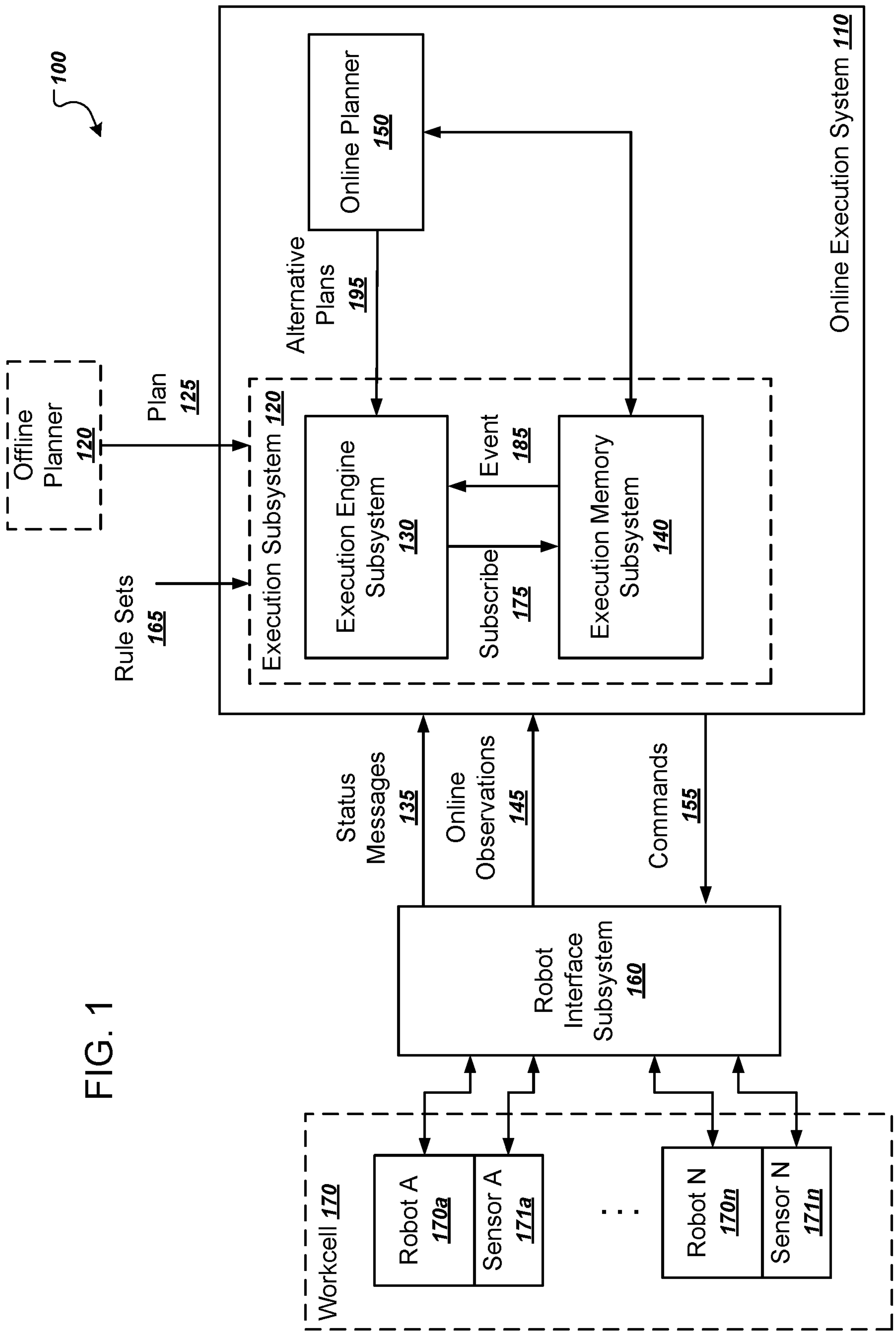
FIG. 1 is a diagram that illustrates an example system.

FIG. 1 is a diagram that illustrates an example system 100. The system 100 is an example of a system that can implement the execution system techniques described in this specification.

The system 100 includes a number of functional components, including an online execution system 110 and a robot interface subsystem 160. Each of these components can be implemented as computer programs installed on one or more computers in one or more locations that are coupled to each other through any appropriate communications network, e.g., an intranet or the Internet, or combination of networks.

In general, the online execution system 110 provides commands 155 to be executed by the robot interface subsystem 160, which drives one or more robots, e.g., robots 170*a-n*, in a workcell 170. In order to compute the commands 155, the online execution system 110 consumes status messages 135 generated by the robots 170*a-n* and online observations 145 made by one or more sensors 171*a-n* making observations within the workcell 170. As illustrated in FIG. 1, each sensor 171 is coupled to a respective robot 170. However, the sensors need not have a one-to-one correspondence with robots and need not be coupled to the robots. In fact, each robot can have multiple sensors, and the sensors can be mounted on stationary or movable surfaces in the workcell 170.

The robot interface subsystem 160 and the online execution system 110 can operate according to different timing constraints. In some implementations, the robot interface subsystem 160 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation. Similarly, the robots can be real-time robots, which means that the robots are programmed to continually execute commands according to a highly constrained timeline. For example, each robot can expect a command from the robot interface subsystem 160 at a particular frequency, e.g., 100 Hz or 1 kHz. If the robot does not receive a command that is expected, the robot can enter a fault mode and stop operating.

The online execution system 110, on the other hand, typically has more flexibility in operation. In other words, the online execution system 110 may, but need not, provide a command 155 within every real-time time window under which the robot interface subsystem 160 operates. However, in order to provide the ability to make sensor-based reactions, the online execution system 110 may still operate under strict timing requirements. In a typical system, the real-time requirements of the robot interface subsystem 160 require that the robots provide a command every 5 milliseconds, while the online requirements of the online execution system 110 specify that the online execution system 110 should provide a command 155 to the robot interface subsystem 160 every 20 milliseconds. However, even if such a command is not received within the online time window, the robot interface subsystem 160 need not necessarily enter a fault state.

Thus, in this specification, the term online refers to both the time and rigidity parameters for operation. The time windows are larger than those for the real-time robot interface subsystem 160, and there is typically more flexibility when the timing constraints are not met.

The system 100 can also optionally include an offline planner 120. The overall goal of the offline planner 120 is to generate, from a definition of one or more tasks to be performed, a plan that will be executed by the robots 170*a-n* to accomplish the tasks. In this specification, a plan is data that assigns each task to at least one robot. A plan also specifies, for each robot, a sequence of actions to be performed by the robot. A plan also includes dependency information, which specifies which actions must not commence until another action is finished. A plan can specify start times for actions, end times for actions, or both.

The offline planning process is typically computationally expensive. Thus, in some implementations, the offline planner 120 is implemented by a cloud-based computing system having many, possibly thousands, of computers. The offline planner 120 is thus commonly physically remote from a facility that houses the workcell 170. On the other hand, the online execute engine 110 is often local to the facility that houses the workcell 170.

This arrangement thus provides three different computing zones. The offline planner 120 can use massive cloud-based computing resources to consider many possibilities for scheduling tasks, while also allowing for online reaction to unanticipated events by the online execution system 110, while also providing the precision and real-time safety mechanisms of the robot interface subsystem 160.

Thus, in operation, the online execution system 110 obtains a workcell-specific plan 125 and issues commands 155 to the robot interface system 160 in order to actually drive the movements of the moveable components, e.g., the joints, of the robots 170*a-n*. In some implementations, the robot interface subsystem 160 provides a hardware-agnostic interface so that the commands 155 issued by onsite execution engine 110 are compatible with multiple different versions of robots. During execution the robot interface subsystem 160 can report status messages 135 back to the online execution system 110 so that the online execution system 110 can make online adjustments to the robot movements, e.g., due to local faults or other unanticipated conditions. The robots 170*a-n* then continually execute the commands specified explicitly or implicitly by the motion plans to perform the various tasks or transitions of the plan.

In order to effectuate the actions of the plan 125, the online execution system 110 can use an execution subsystem 120 that includes an execution engine subsystem 130 and an execution memory 140 subsystem.

The execution engine subsystem 130 can employ both domain-specific and domain-agnostic logic in order to determine when particular events trigger the execution of a particular action or plan. The main inputs to the execution engine subsystem are a plan 125, which can optionally be generated by a cloud-based offline planner 120 as described above; and rule sets 165.

The rule sets 165 specify particular patterns that, when matched, should trigger particular actions. As one example, suppose that a particular plan specifies that a robot should pick up a hammer if it is closer than 1 meter. A user can express this functionality in an appropriate rule set language by writing a rule set that specifies (1) a pattern relating to closeness of the hammer, and (2) a body that specifies the action of picking up the hammer when the corresponding pattern is matched.

The execution memory subsystem 140 maintains a state of the operating environment and uses new observations to determine when patterns of the rule sets 165 are matched. The execution memory subsystem 140 receives subscription requests 175 from the execution engine subsystem 130. The subscription requests 175 specify entities within the environment that the execution memory subsystem 140 should monitor. As new online observations 145 are received, the execution memory subsystem 140 can continually perform pattern matching to determine if any rule set patterns have been matched.

When a pattern is matched, the execution memory subsystem 140 can emit an event 185 that is received by the execution engine subsystem 130. This can cause the execution engine subsystem 130 to kick off execution of a new plan or to kick off execution of a new skill.

Optionally, the execution engine subsystem 130 can communicate with an online planner 150 in order to generate plans during execution time. For example, if the execution memory subsystem 140 emits an event 185 indicating that the hammer is closer than one meter away, the execution engine subsystem 130 can communicate with the online planner 150 to generate a plan for picking up the hammer, given its recently observed position within the working environment.

Figure 2:
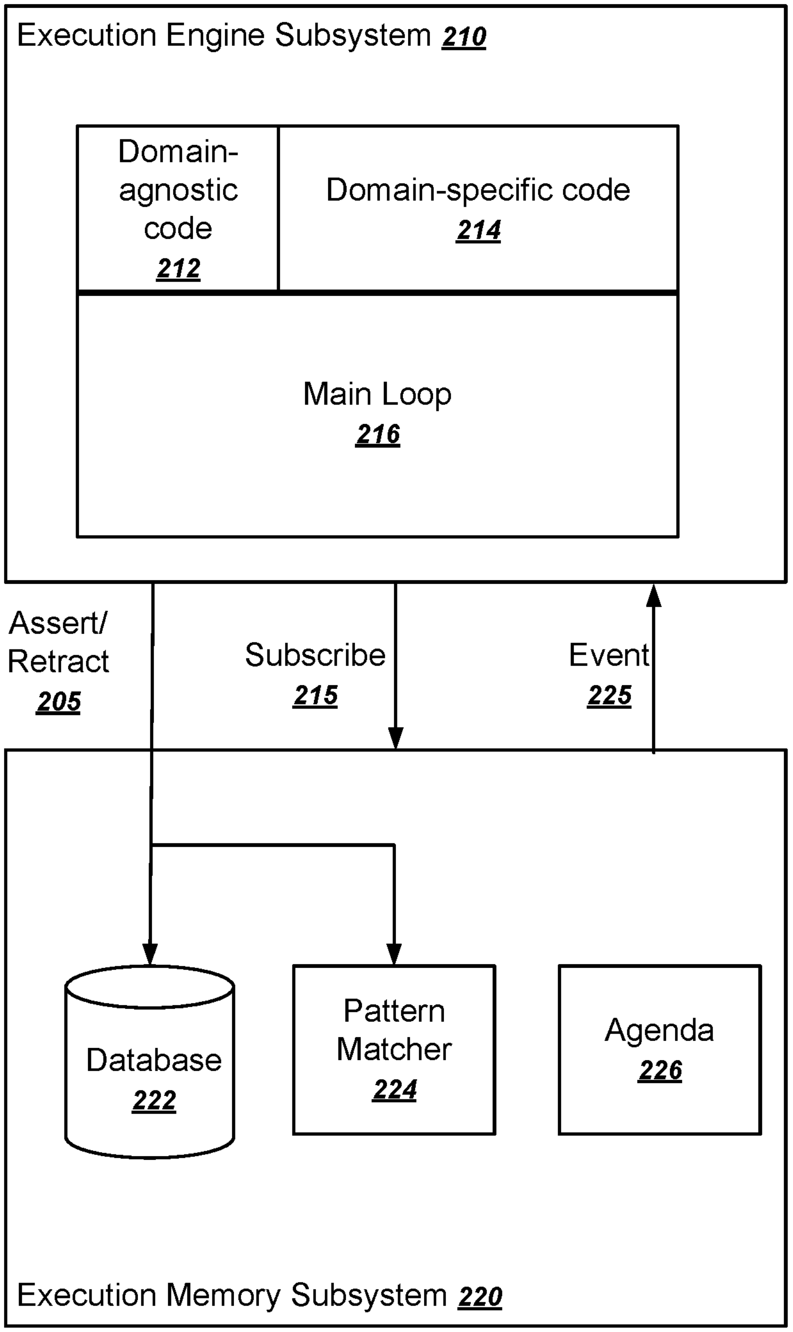
FIG. 2 is a more detailed view of the components of the execution engine subsystem and the execution memory subsystem.

FIG. 2 is a more detailed view of the components of the execution engine subsystem and the execution memory subsystem.

The execution engine subsystem 210 provides the framework to match events generated from pattern matches to invoking procedures. The logic of the execution engine subsystem 210 is split into two parts, a domain-agnostic part 212, which contains general rules of operation, such as how to process and execute a plan; and a domain-specific part 214.

The domain-specific code 214 can include domain- or application-specific rule sets, for example, to monitor for specific conditions expected to occur and specific instructions on how to mitigate problems. For example, the system can monitor for errors which have been observed but which the general monitoring mechanisms do not yet recognize.

The execution memory subsystem 220 stores data in a database 222 and performs pattern matching with the pattern matcher 224.

The database 222 stores facts. Each fact can be represented as an instance of a message in a structured, hierarchical, data language. In other words, the content of a message can include one or more other messages. The execution engine subsystem 210 can modify facts in the database 222 by providing assert or retract requests 205.

The database 222 can assign a unique fact index to each fact in the database 222.

Once stored, the database 222 can enforce the immutability of facts. Thus, in order to change a fact about the operating environment, the fact must be removed from the database 222 and added again, which causes the fact to be assigned a new fact index.

The pattern matcher 224 is a module that issues events in response to newly matched rule set patterns. Clients can subscribe to events described by a pattern by issuing a subscription request 215 to the pattern matcher 224. A pattern lists a number of variables and their type, e.g., what type of message to expect, and an expression over these variables. The variables determine the potential set of facts from the database for which the pattern is tested.

The segregation of the pattern matching functionality of the execution memory subsystem 220 from the code execution functionality of the execution engine subsystem 210 allows the execution memory subsystem 220 to service more clients than merely the execution engine subsystem 210. For example, as illustrated in FIG. 1, an online planner of the system can use events generated by the pattern matcher 224 in order to inform planning decisions. For example, if a hammer is nearby, the online planner might plan a slower movement to reach the hammer than when the hammer is far away.

In some implementations, the pattern matcher 224 does not add or delete facts due to evaluation of patterns, which means that facts cannot be modified in-place. In addition, the pattern matcher 224 can generate events 225 only for newly matched patterns. In other words, the pattern matcher 224 can bypass generating events for which a pattern matches existing data in the database 222 at the time of subscription. This substantially reduces the amount of events that are triggered, which in turn makes processing the events much more efficient.

The pattern matcher 224 can use any appropriate pattern matching algorithm. In some implementations, the pattern matcher 224 uses the Rete algorithm with a Common Expression Language. The Rete algorithm analyzes the tests and creates a pattern matching network separated into two parts: the first alpha network matches the part of the patterns which concern only a single variable/fact. The beta network then performs a join on the parts of the pattern that concern two variables. In the end is a set of leaf nodes corresponding to the events of interest. On addition or removal of a fact, e.g., due to robot actions, rule processing, or new sensor observations, the pattern matcher 224 can reevaluate the network to determine if the fact update causes a new event.

Newly generated events are placed on the agenda 226, which is a data structure that is used for performing agenda deconfliction.

In other words, the agenda 226 is used to determine which event should be emitted first in the case that multiple events were activated by pattern matching on a newly added or removed fact. Processors of the events might in turn make changes that would invalidate other events on the agenda, which would hence not be called.

The execution engine subsystem 210 is a processing framework that provides a generalized way to map events emitted by the execution memory subsystem 220 to executable code. This mapping is a rule, with a rule head describing the pattern, and a rule body which is the lambda function to execute. The execution engine subsystem 210 can implement the code using any appropriate framework, for example, using a high-level programming, e.g., C, C++, or Python, or using a custom formal language.

The execution engine subsystem 210 then operates on rule sets that provide the functionality to execute and to monitor plans. One rule set can provide basic handling of information, for example, to determine whether an action becomes executable as new information becomes known. Further rule sets can enable the execution of plans having different semantics, for example, sequences of actions that have to be executed in a specific order one action at a time, or a partially ordered plan where some actions may be executed in parallel, which is common in operating environments having multiple robots. Further rule sets can provide the functionality for execution monitoring, for example, for ensuring the safety of human operators and equipment.

Figure 3:
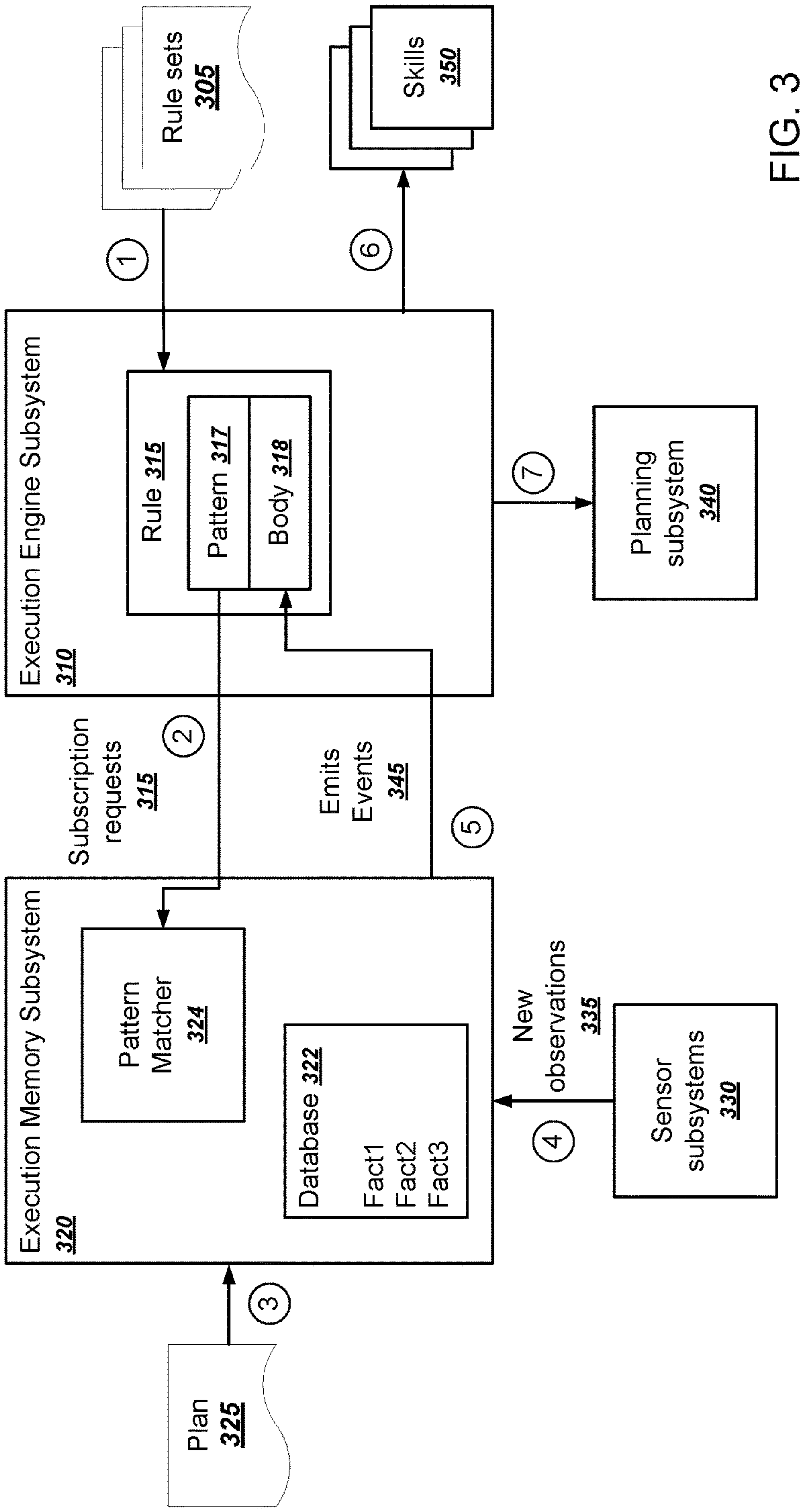
FIG. 3 illustrates a flow using subscriptions and events.

FIG. 3 illustrates a flow using subscriptions and events. As discussed above, the system includes an execution engine subsystem 310 and an execution memory subsystem 320. These subsystems receive information feeds from sensor subsystems 330 and interface with planning subsystems 340 and systems for executing skills 350. For clarity, the operational flow will be described step-by-step, but in practice, such steps can be happening in a different order and multiple of such steps can be happening continually and in parallel.

At step 1, the execution engine subsystem 310 loads rule sets 305.

At step 2, the execution engine subsystem 310 provides subscription requests 315 to the pattern matcher 324 by providing the patterns 317 of the rule sets 305.

At step 3, the execution memory subsystem 320 receives a plan 325 to execute. The plan 325 and the subscription patterns 317 are stored as facts in the database 322.

At step 4, new observations 335 are received from the sensor subsystems 330, and the facts in the database 322 are updated accordingly.

At step 5, the pattern matcher 324 evaluates the newly added or retracted facts in the database 222 to determine if any patterns are newly matched. If so, the execution memory subsystem emits one or more events 345 to the execution engine subsystem 310.

At step 6, the execution engine subsystem 310 maps the received events to rules and executes the corresponding rule bodies, which in turn can either cause data changes in the execution memory subsystem 320 or invoke the performance of skills 350.

At step 7, if an execution monitoring rule set detects a fault or another exception, the planning subsystem can be invoked to generate a recovery action or a correction plan.

Figure 4A:
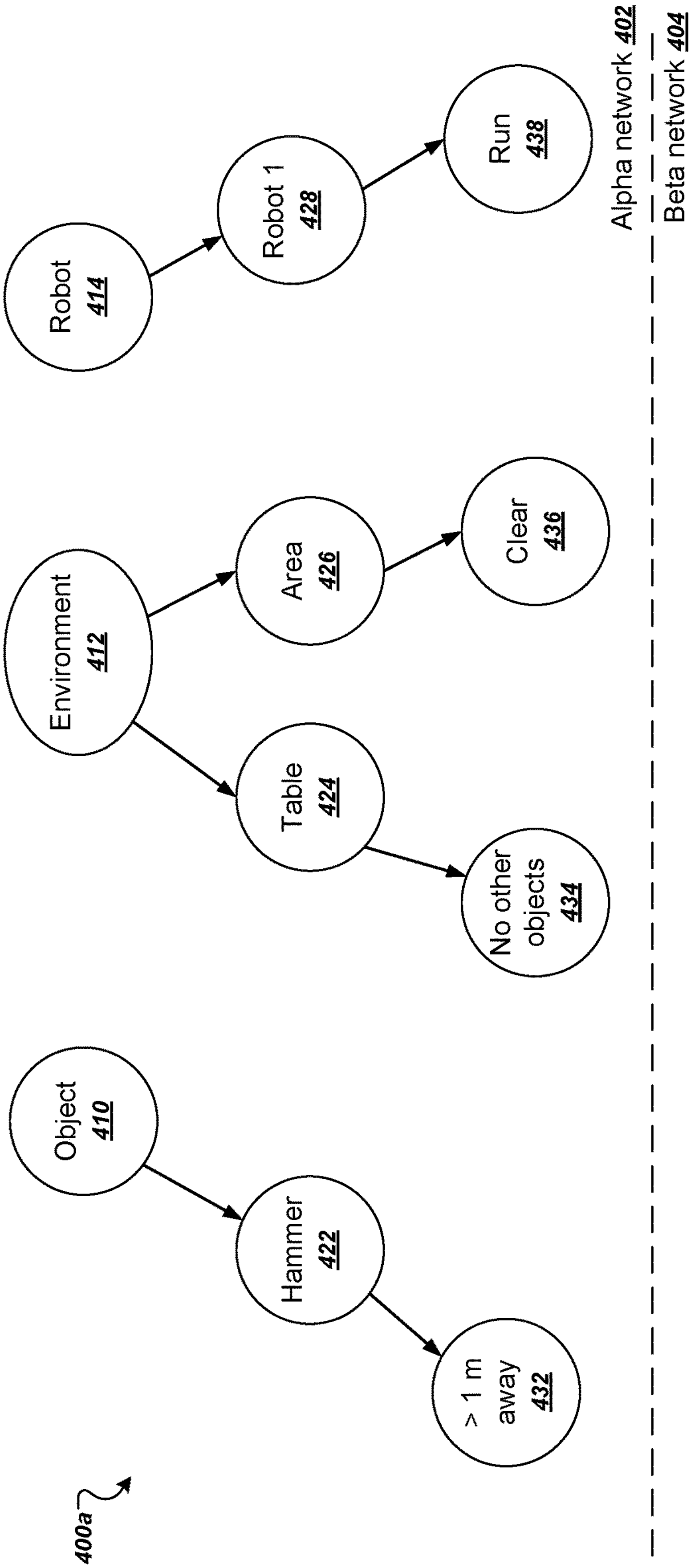
FIG. 4A illustrates a graph network after initialization of an alpha network.
Figure 4B:
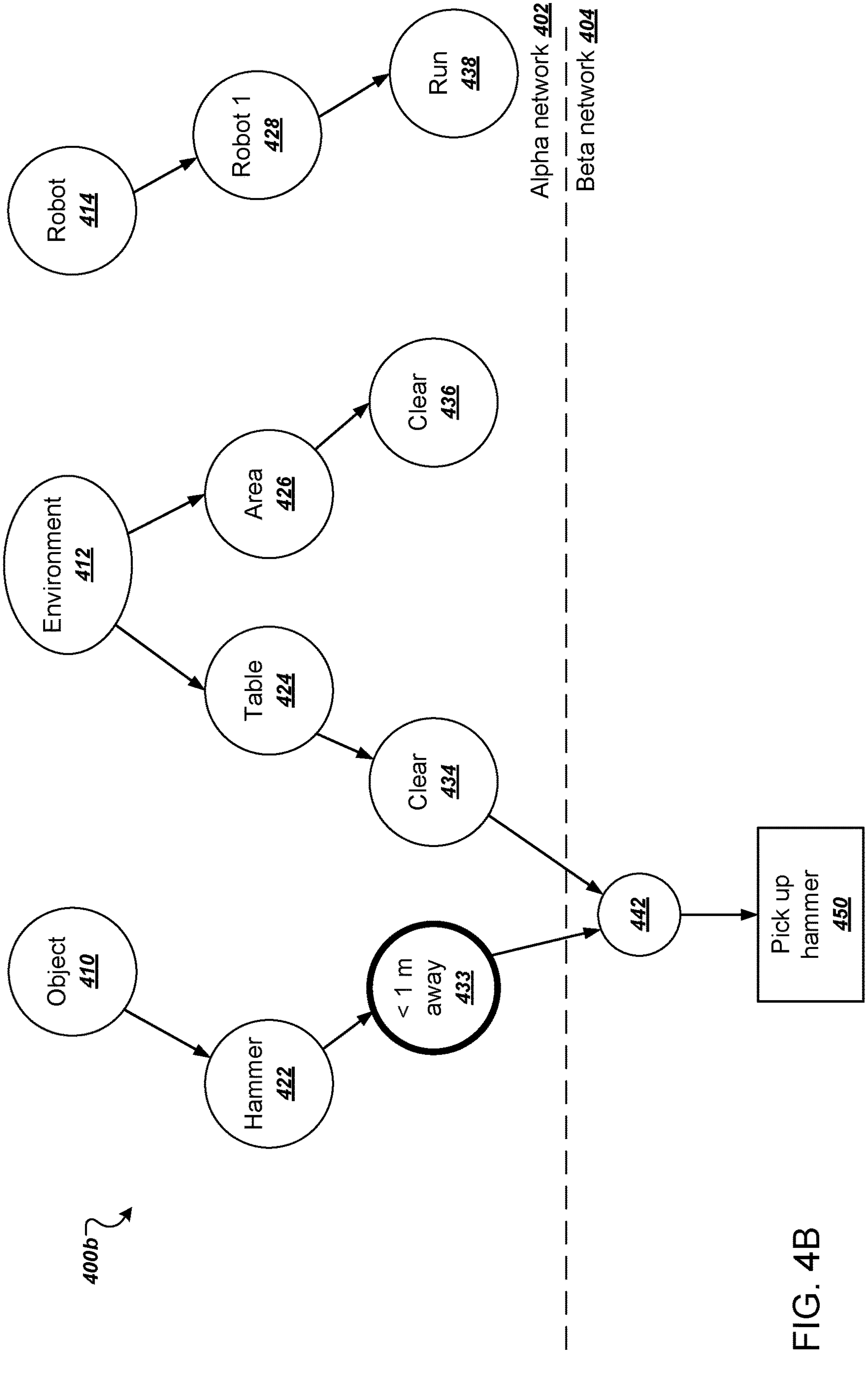
FIG. 4B illustrates a graph network after a new message is received.
Figure 4C:
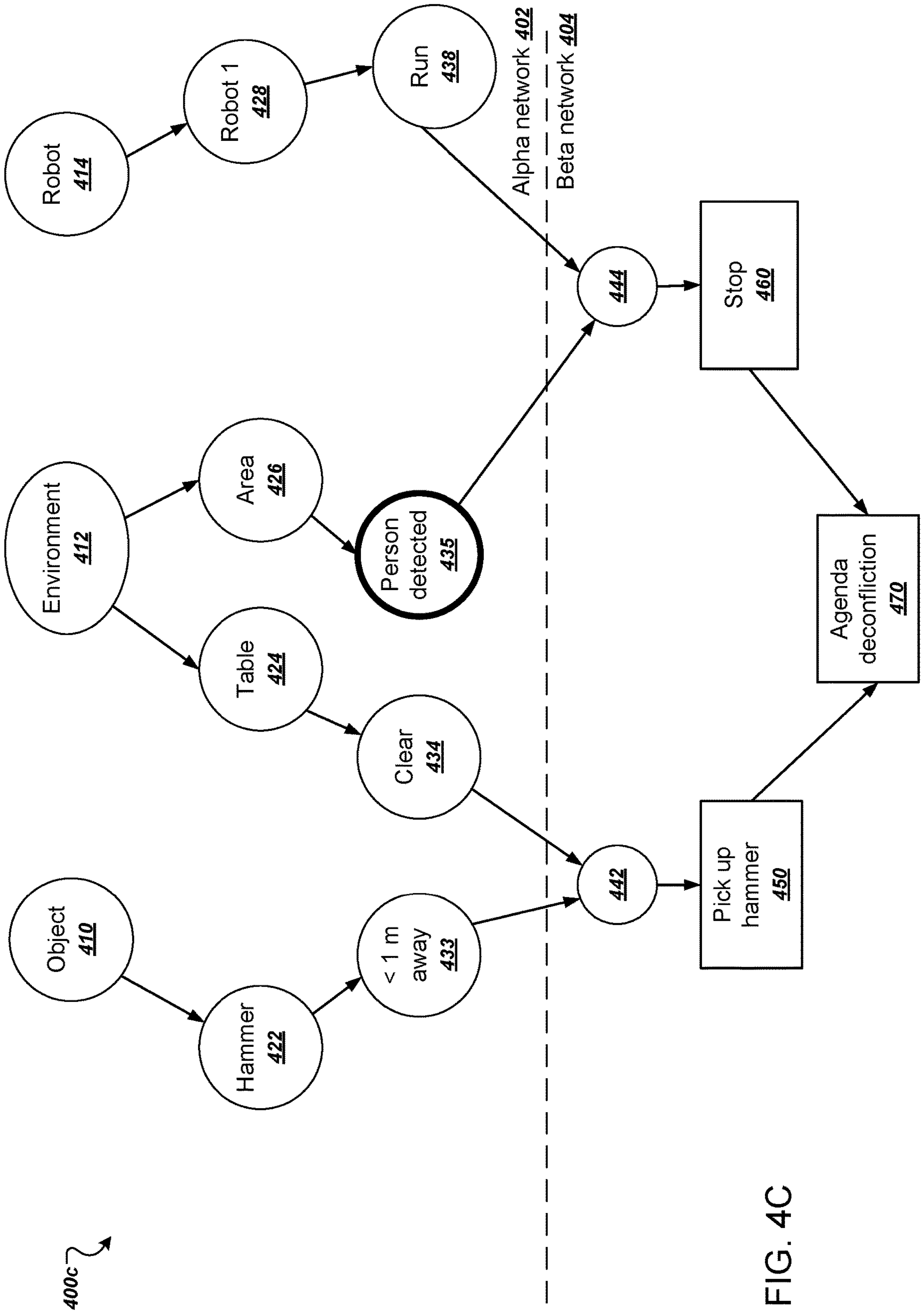
FIG. 4C illustrates a graph network after another new message is received.

FIGS. 4A-4C illustrate using a graph network to perform pattern matching. This example illustrates two simple rules, one related to a robot picking up a hammer when it is nearby, and one related to environment safety.

The first example rule is shown in TABLE 1, expressed in pseudocode of an example expression language:

TABLE 1

| | |
|---|---|
| 1 | Object: hammer |
| 2 | Condition1: distance < 1 m |
| 3 | Condition2: table has no other objects |
| 4 | Action: Execute pick_up_hammer skill |

The example rule has a number of fields.

On line 1, a first field indicates the message type that will match this rule and a message subtype. In this example, the message type is "object," and the message subtype is "hammer."

On line 2, the field specifies a first condition as a distance constraint, which is that the distance between a robot and the hammer must be less than 1 meter.

On line 3, the field specifies a second condition as an environmental constraint, which is that the table on which the robot is operating has to be clear of other objects.

On line 4, the field specifies an action to be taken, which is that the robot should execute a "pick_up_hammer" skill.

The second example rule is shown in TABLE 2:

TABLE 2

| | |
|---|---|
| 1 | Robot: robot1 |
| 2 | Condition1: State = Run |
| 3 | Condition2: Area = person detected |
| 4 | Action: Execute stop |

On line 1, a first field indicates that message type is "robot," and the message subtype is "robot1." In other words, this rule relates only to robots and specifically to a robot with an identifier of "robot1."

On line 2, the field specifies a first condition as a state constraint, which is that the robot is in a running state.

On line 3, the field specifies a second condition as an environmental constraint, which is that the environment has a person within the workcell.

On line 4, the field specifies an action to be taken, which is that the robot should perform an emergency stop action.

FIG. 4A illustrates a graph network 400*a* after initialization of the alpha network 402 using the fields shown in the example rules. The graph includes a first layer of type nodes 410, 412, and 414. The system can use the type nodes as a guard for fact updates that are received by the system. This allows for efficient processing because a single fact update will traverse only a single initial node in the first layer of type nodes.

Each of the direct children of the type nodes are subtype nodes that represent entities in the working environment about which fact updates can have an impact. In this example, the graph includes the following subtype nodes: a hammer node 422, a table node 424, an area node 426, and a robot 1 node 428.

The direct children of the subtype nodes represent facts for satisfied conditions in the rules. In the initial state, these facts are represented by a greater-than-one-meter node 432 that applies to the hammer node 422, a no-other-objects node 434 that applies to the table node 424, an area-clear node 436 that applies to the area node 426, and a run-state node 438 that applies to the robot 1 node 428.

With this state of conditions, no actions are triggered because there are no rules for which all conditions are satisfied. Thus, the beta network 404 is empty.

FIG. 4B illustrates a graph network 400*b* after a new message is received. In this example, the system generates a new message to represent a new observation that the hammer is now less than one meter away. The contents of the new message are illustrated in TABLE 3:

TABLE 3

| | |
|---|---|
| 1 | Object: hammer |
| 2 | Distance < 1 m |

As shown, the message includes a type of "Object," and a subtype of "hammer." Using this fact update to traverse the graph modifies the alpha network 402 by adding a node 433 to represent that the hammer is less than 1 meter away.

The system then populates the beta network 404 by generating a joint node 442 to represent that the conditions of the nodes 433 and 434 occur in the same rule. And because all conditions of the first rule are satisfied, the system then generates an event 450 to represent that the action of the rule can be triggered.

Thus, the execution subsystem can trigger the robot to perform the skill for picking up the hammer. Notably, because of the construction of the alpha network 402 and beta network 404 and the strongly typed messages, none of the other nodes in the graph 400*b* needed to be evaluated, thereby improving the computational efficiency when deciding which actions to take.

FIG. 4C illustrates a graph network 400*c* after another new message is received. In this example, the system generates a new message to represent a new observation that a person has been detected in the workcell. The contents of the new message are illustrated in TABLE 4:

TABLE 4

| | |
|---|---|
| 1 | Environment: Area |
| 2 | Person detected |

The message includes a type of "Environment," and a subtype of "Area." The message contents represent that sensors have detected a person entering the workcell.

Using this fact update to traverse the graph modifies the alpha network 402 by adding a person-detected node 435 to represent that a person has entered the workcell.

The system then populates the beta network 404 by generating a new joint node 444 to represent that the conditions of the nodes 435 and 438 occur in the same rule. And because all conditions of the second rule are now satisfied, the system then generates an event 460 to represent the action of performing an emergency stop.

At this point in the process, two conflicting actions have been triggered: picking up the hammer 450 and performing an emergency stop 460. Thus, the system can perform agenda deconfliction 470 to determine which of the rules to execute. In some situations, the system can perform all of multiple rules if none of the rules are conflicting. However, in this example, performing an emergency stop conflicts with picking up the hammer.

In some implementations, the system automatically classifies rules into a hierarchy according to safety considerations. For example, the hierarchy can have rules relating to user safety highest, rules relating to robot safety next, rules relating to product safety next, and normal operation rules last. Thus, for example, a rule relating to user safety will always overrule a rule relating to robot safety.

In this example, performing the emergency stop is a rule relating to user safety, and thus it overrides the first rule because it merely relates to normal robot functions. Accordingly, the execution subsystem can cause the robot to perform the emergency stop instead of picking up the hammer.

Figure 5:
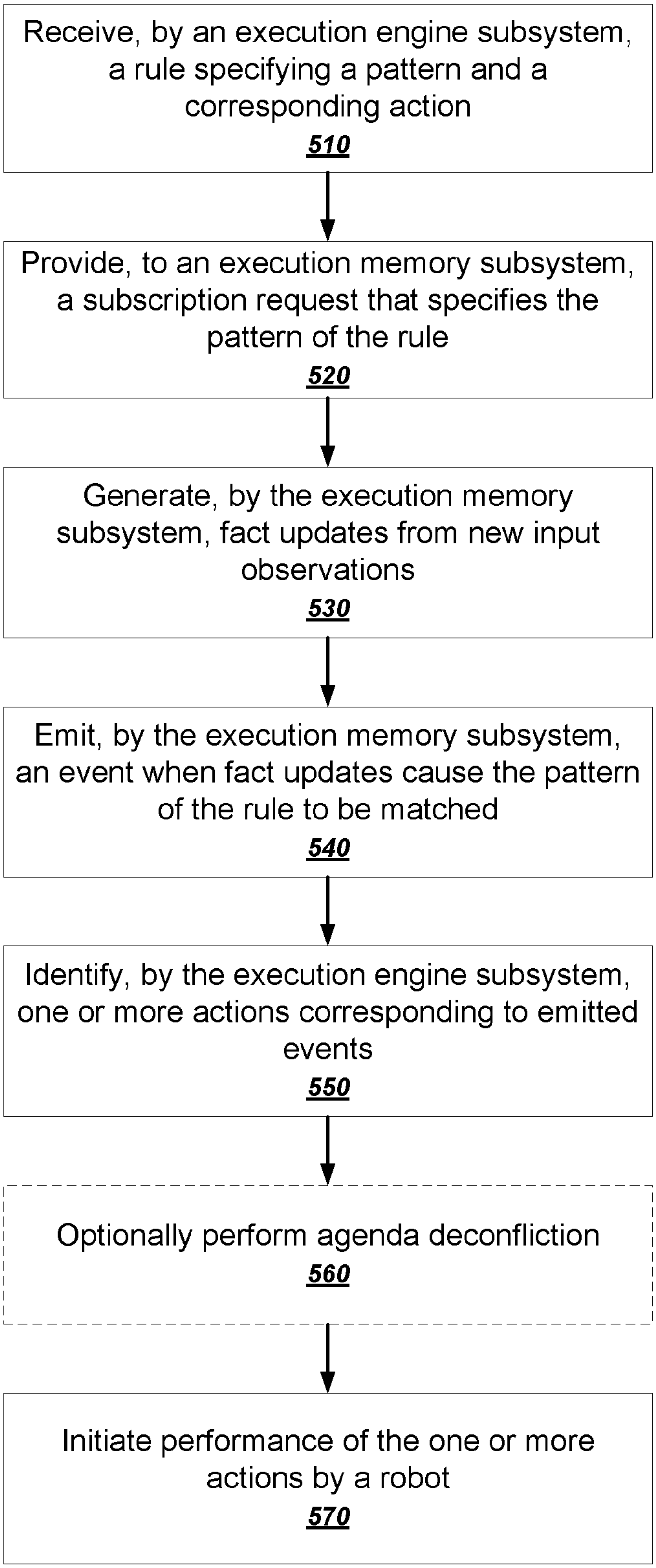
FIG. 5 is a flowchart of an example process for executing rules.

FIG. 5 is a flowchart of an example process for executing rules. The example process can be performed by an appropriately programmed execution subsystem having one or more computers in one or more locations, e.g., the execution subsystem 120 of FIG. 1. The process will be described as being performed by an appropriately execution engine subsystem and execution memory subsystem.

The execution engine subsystem receives a rule specifying a pattern and a corresponding action (510). As described above the rule can have a type and a subtype that specifies properties of entities in the working environment of a robot. The pattern of the rule can include a set of conditions that relate to the entities in the working environment and how they relate to one another in time or space.

The execution engine provides to an execution memory subsystem a subscription request that specifies the pattern of the rule (520). As described above, the overall architecture of the execution system can maintain a separation between the execution engine subsystem and the execution memory subsystem, which allows other clients in the system to also provide subscription requests to the execution memory subsystem.

For example, a perception subsystem that drives sensors in the workcell can subscribe to the execution memory subsystem in order to receive messages that represent necessary configuration changes. The configuration changes can be due to fault conditions or a change in the robot's tasks. For example, a change in the type of object that is being assembled can require a change to the configuration of the perception system, which can be driven by a fact update in the execution memory subsystem.

As another example, a robot configuration subsystem can subscribe to the execution memory subsystem to receive messages that represent updated robot configurations. The robot configurations can be updated to change speed and other safety limits depending on various fact updates. For example, if a human is detected in the workcell, that fact update can trigger a message to the robot configuration subsystem to alter one or more speed or safety limits.

The execution memory subsystem generates fact updates from new input observations (530). The execution memory subsystem can update a database with the fact updates, which can cause facts to be added to the database or facts to be removed from the database.

The execution memory subsystem emits an event when a fact update causes a pattern of a rule to be matched (540). In order to prevent an overflow of events being emitted by the system, the execution memory subsystem can be configured to emit an event only upon the first instance of the pattern being matched. In some implementations, the facts are immutable in the database, meaning that fact updates can only add new facts that supersede prior facts or remove existing facts in the database. The emitted events are received by their respective clients, which can include the execution engine subsystem or other clients, e.g., a planner.

The execution engine subsystem identifies one or more actions corresponding to the emitted events (550). Each event can include an identifier of a rule whose pattern caused the event to be emitted. The execution engine subsystem can thus look up the corresponding action for the pattern that caused the event to be emitted.

The execution engine subsystem can also optionally perform agenda deconfliction (560). Part of the deconfliction process can involve a hierarchy for enforcing safety constraints, and the execution engine subsystem can select an action for a rule having the highest level on the hierarchy. For example, the hierarchy can include these levels from highest priority to lowest: user safety, robot safety, product safety, normal.

The execution engine subsystem initiates performance of the one or more actions by a robot (570). As described above, this can cause control to transition from domain-agnostic code to domain-specific code. For example, instead of the robot execution domain-agnostic code about which action to perform next, the system can transition to domain-specific code for performing a particular skill, e.g., sanding a surface, welding a part, or attaching a connector. After the particular skill has been completed, control can transition back to the domain-agnostic code.

In addition to the task execution implementations described above, the execution memory subsystem can be used to serve more generally as a central component to collect, process, and disseminate information about the robot's environment. All components of the system could then deliver data to the execution memory subsystem to ingest. Rules would apply automatic updates to the data, synchronize different data sources, disambiguate the data, or flag other inconsistencies. The components could then subscribe to receive particular pieces of information or to be notified of relevant data updates. The updates can be constrained by the conditions in the pattern supplied at subscription time. For example, a component may only ask to be notified about objects that are nearby or objects that can be picked up.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot.

In this specification, a motion swept volume is a region of the space that is occupied by at least a portion of a robot or tool during the entire execution of a motion plan. The motion swept volume can be generated by collision geometry associated with the robot-tool system.

In this specification, a transition is a motion plan that describes a movement to be performed between a start point and an end point. The start point and end point can be represented by poses, locations in a coordinate system, or tasks to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the onsite execution system 110 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising one or more computers and one or more storage devices storing instructions that are operable, when executed by the one or more computers, to cause the one or more computers to implement:

- an execution engine subsystem configured to:
  - receive one or more rules, wherein each rule has a type and a subtype that represents a particular entity in an operating environment of a robot, wherein each rule specifies a pattern comprising one or more conditions and specifies an action to be performed by the robot when all of the one or more conditions of the pattern are satisfied,
  - provide a subscription request to an execution memory subsystem, wherein the subscription request comprises respective patterns of one or more corresponding rules,
  - receive events emitted by the execution memory subsystem, to match the emitted events to corresponding identified actions specified by the one or more rules, and to initiate performance of respective actions corresponding to the rules identified by the emitted events; and
- an execution memory subsystem configured to
  - receive subscription requests from the execution engine subsystem,
  - receive new observations, convert the new observations into fact updates, and to perform pattern matching with the fact updates against the patterns of the subscription requests, and
  - emit events to the execution engine subsystem for patterns that have been matched by the fact updates.

Embodiment 2 is the system of embodiment 1, wherein the execution engine subsystem executes on a separate computer system than the execution memory subsystem.

Embodiment 3 is the system of any one of embodiments 1-2, wherein the execution memory subsystem is further configured to receive subscription requests from other clients in an online robotics control system.

Embodiment 4 is the system of embodiment 3, wherein the other client is a planning subsystem of the online robotics control system.

Embodiment 5 is the system of any one of embodiments 1-4, wherein the execution memory subsystem is configured to process the fact updates by additions that supersede prior facts.

Embodiment 6 is the system of any one of embodiments 1-5, wherein the execution engine subsystem is configured to perform agenda deconfliction for multiple actions that are triggered by a fact update.

Embodiment 7 is the system of embodiment 6, wherein performing agenda deconfliction comprises enforcing a hierarchy of rules by selecting only an action of a rule that is highest in the hierarchy of rules.

Embodiment 8 is the system of any one of embodiments 1-7, wherein performing pattern matching with the fact updates against the patterns of the subscription requests comprises constructing a graph network having a first layer of nodes that are type nodes corresponding to types of the one or more rules.

Embodiment 9 is the system of embodiment 8, wherein constructing the graph network comprises generating subtype nodes corresponding to respective entities in a working environment of the robot.

Embodiment 10 is a method comprising performing the operations of any one of embodiments 1 to 9.

Embodiment 11 is a computer storage medium encoded with a computer program, the program comprising instructions that are operable, when executed by data processing apparatus, to cause the data processing apparatus to perform the operations of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:

receiving, by an execution engine subsystem configured to initiate actions on a robot, one or more rules, wherein each rule specifies a pattern comprising one or more conditions and an action to be performed by the robot when all of the one or more conditions of the rule are satisfied;

receiving, by an execution memory subsystem and from the execution engine subsystem, a subscription request, wherein the subscription request comprises respective patterns of one or more corresponding rules;

receiving, by an execution memory subsystem, new sensor observations;

matching, by the execution memory subsystem, the new sensor observations to the patterns of the one or more rules outlined by the subscription request;

receiving, by the execution engine subsystem from an execution memory subsystem, one or more emitted events that represent patterns matched by converted sensor observations;

matching, by the execution engine subsystem, the received one or more events to an action specified by the one or more rules; and initiating, by the execution engine subsystem, execution of the action on the robot.

2. The method of claim 1, further comprising maintaining, by the execution memory subsystem, a database of facts about an environment of the robot based on inputs from one or more sensor subsystems in the environment of the robot.

3. The method of claim 1, wherein the action specifies the performance of a skill by the robot.

4. The method of claim 1, further comprising executing, by the execution engine subsystem, domain-specific rule sets.

5. The method of claim 1, further comprising servicing, by the execution memory subsystem, requests for fact updates received from other clients as well as the execution engine subsystem.

6. The method of claim 1, wherein matching the received one or more events to an action specified by the one or more rules comprises constructing a graph network having a first layer of nodes that are type nodes corresponding to types of the one or more rules.

7. The method of claim 6, wherein constructing the graph network comprises generating subtype nodes corresponding to respective entities in a working environment of the robot.

8. One or more non-transitory computer storage media encoded with computer program instructions that when executed by one or more computers cause the one or more computers to perform operations comprising:

receiving, by an execution engine subsystem configured to initiate actions on a robot, one or more rules, wherein each rule specifies a pattern comprising one or more conditions and an action to be performed by the robot when all of the one or more conditions of the rule are satisfied;

receiving, by an execution memory subsystem and from the execution engine subsystem, a subscription request, wherein the subscription request comprises respective patterns of one or more corresponding rules;

receiving, by an execution memory subsystem, new sensor observations;

matching, by the execution memory subsystem, the new sensor observations to the patterns of the one or more rules outlined by the subscription request;

receiving, by the execution engine subsystem from an execution memory subsystem, one or more emitted events that represent patterns matched by converted sensor observations;

matching, by the execution engine subsystem, the received one or more events to an action specified by the one or more rules; and initiating, by the execution engine subsystem, execution of the action on the robot.

9. The one or more computer storage media of claim 8, wherein the execution memory subsystem is configured to maintain a database of facts about an environment of the robot based on inputs from one or more sensor subsystems in the environment of the robot.

10. The one or more computer storage media of claim 8, wherein the action specifies the performance of a skill by the robot.

11. The one or more computer storage media of claim 8, wherein the execution engine subsystem is configured to execute domain-specific rule sets.

12. The one or more computer storage media of claim 8, wherein the execution memory subsystem is configured to service requests for fact updates received from other clients as well as the execution engine subsystem.

13. The one or more computer storage media of claim 8, wherein matching the received one or more events to an action specified by the one or more rules comprises constructing a graph network having a first layer of nodes that are type nodes corresponding to types of the one or more rules.

14. A system comprising:

one or more computers and one or more storage devices storing instructions that are operable, when executed by the one or more computers, to cause the one or more computers to perform operations comprising:

receiving, by an execution engine subsystem configured to initiate actions on a robot, one or more rules, wherein each rule specifies a pattern comprising one or more conditions and an action to be performed by the robot when all of the one or more conditions of the rule are satisfied;

receiving, by an execution memory subsystem and from the execution engine subsystem, a subscription request, wherein the subscription request comprises respective patterns of one or more corresponding rules;

receiving, by an execution memory subsystem, new sensor observations;

matching, by the execution memory subsystem, the new sensor observations to the patterns of the one or more rules outlined by the subscription request;

receiving, by the execution engine subsystem from an execution memory subsystem, one or more emitted events that represent patterns matched by converted sensor observations;

matching, by the execution engine subsystem, the received one or more events to an action specified by the one or more rules; and initiating, by the execution engine subsystem, execution of the action on the robot.

15. The system of claim 14, wherein the execution memory subsystem is configured to maintain a database of facts about an environment of the robot based on inputs from one or more sensor subsystems in the environment of the robot.

16. The system of claim 14, wherein the action specifies the performance of a skill by the robot.

17. The system of claim 14, wherein the execution engine subsystem is configured to execute domain-specific rule sets.

18. The system of claim 14, wherein the execution memory subsystem is configured to service requests for fact updates received from other clients as well as the execution engine subsystem.

19. The system of claim 14, wherein matching the received one or more events to an action specified by the one or more rules comprises constructing a graph network having a first layer of nodes that are type nodes corresponding to types of the one or more rules.

20. The system of claim 19, wherein constructing the graph network comprises generating subtype nodes corresponding to respective entities in a working environment of the robot.

* * * * *